Jan. 13, 1942.     B. E. SHAW     2,269,865
SOLENOID VALVE
Filed Feb. 12, 1940
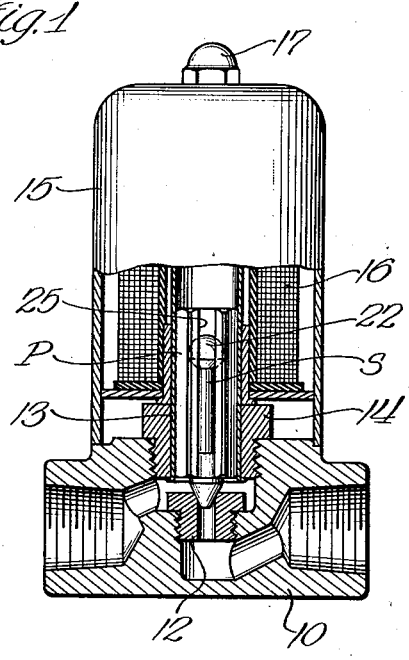
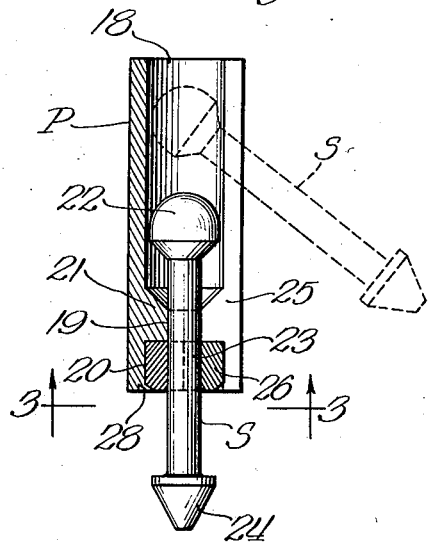
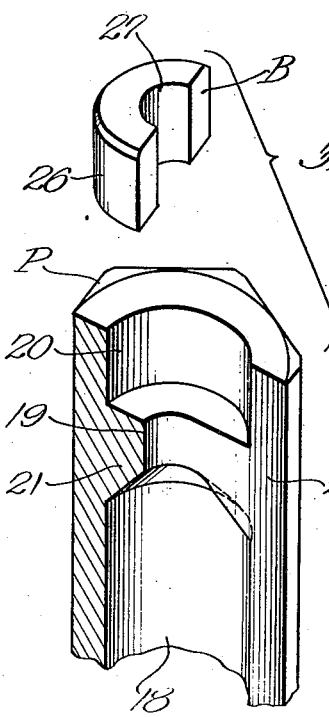
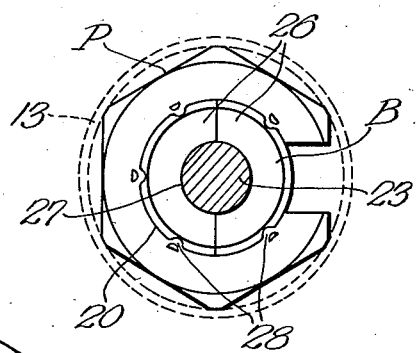
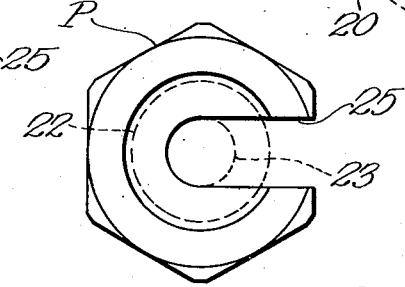
INVENTOR.
Burton E. Shaw
BY Bair & Freeman
ATTORNEYS Patented Jan. 13, 1942

2,269,865

UNITED STATES PATENT OFFICE 2,269,865

SOLENOID VALVE

Burton E. Shaw, Bristol, Ind., assignor to Penn Electric Switch Co., Goshen, Ind., a corporation of Iowa Application February 12, 1940, Serial No. 318,529

5 Claims. (Cl. 251—44)

My present invention relates to a solenoid valve, particularly the plunger and stem thereof which are formed and assembled in a novel manner.

One object of the invention is to provide a simple and inexpensive plunger and stem construction in which there is lost motion between the plunger and stem, and the stem has a shank slidable with relation to the plunger and provided with an integral head to be struck by a shoulder of the plunger and thereby propelled in one direction when the solenoid coil is energized for moving the plunger in one direction.

Another object is to provide a plunger and stem assembly in which the stem has a valve plug and a head, the two being so constructed that the stem is distinguished from the usual two-part construction in which the head is screwed on the stem, thus eliminating in my improved construction crystallization and subsequent breaking of the head from the stem when the two are made of separate parts.

Still another object is to form the plunger with a slot therein with which a stem with an integral head may be assembled, a split bushing being used to hold the two assembled and at the same time eliminate hammer strains from all parts except a shoulder which is integral with the plunger and a head which is integral with the stem.

Still a further object is to provide a plunger which has a slot inwardly from one side thereof to receive a shank of the plunger stem, the bottom of this slot for a portion of the length of the slot being enlarged to receive the head of the stem and the part that is not enlarged thereby constituting a shoulder integral with the plunger for engaging the head of the stem when the solenoid is energized.

Although the invention is susceptible of a variety of embodiments, it is unnecessary to fully describe and illustrate more than a single form thereof for the purpose of presenting a full understanding of the invention both from its structural and functional standpoints. Accordingly, on the accompanying drawing I have illustrated a preferred and desirable embodiment of my plunger and stem construction, said drawing forming a part of this specification and throughout the various views thereof like reference characters being used to refer to the same parts.

Considering now the drawing in detail:

Figure 1 is a vertical sectional view through a solenoid valve embodying my invention, a portion thereof being shown in side elevation;

Figure 2 is an enlarged vertical sectional view through the plunger and stem of the valve showing steps in the assembly of the two with relation to each other;

Figure 3 is a sectional view on a further enlarged scale and taken on the line 3—3 of Figure 2, and showing by dotted lines the relation of the plunger to a plunger tube in which it is slidable;

Figure 4 is a plan view of the plunger and shows by dotted lines the relative position of the head and shank of the stem, and Figure 5 is a sectional view in exploded perspective, showing the lower end of the plunger and a retainer element for the stem.

On the accompanying drawing I have used the reference numeral 10 to indicate a valve body. A valve seat element 12 is removably positioned therein. A plunger tube 13 is positioned in a closure nut 14 and extends upwardly into a solenoid coil housing 15. A solenoid coil 16 is mounted in the housing surrounding the tube and the housing is retained in position by a nut or cap screw 17.

Slidable in the plunger tube 13 is a plunger P and with it is associated a stem S. The plunger P has a bore 18 which is reduced at its lower end as indicated at 19, and then again enlarged as indicated at 20. The result is a shoulder 21 adapted to strike a head 22 formed on the stem S. The head 22 is integral with a shank 23 of the stem and also integral with the shank is a valve plug 24 adapted for seating against the valve seat 12. A slot 25 extends inwardly from one side of the plunger P and is substantially the same width as the shank 23, as shown in Figure 4.

The enlarged or counterbored part 20 of the plunger P receives a split bushing or ring B formed of two arcuate halves indicated at 26. The split bore B indicated at 27 is substantially the same size as the shank 23, the parts being related so that the shank can slide freely in the bushing.

Heretofore it has been customary to form the head of a solenoidal plunger stem as a separate part screwed on the shank of the stem. Considerable difficulty has been experienced in breakage of the shank at the point where it enters the head, due to the hammering of the plunger against the head each time the solenoid is energized. With my construction, this weakness is eliminated.

At the same time, provision has been made for assembling the stem in the plunger. The slot 25 permits passage of the shank 23 therethrough, as shown by dotted lines in Figure 2. The stem S is slid downwardly and finally swung to the full line position. The retainer elements 26 are then placed in the counterbore 20 and may be retained therein by deforming the metal of the lower end of the plunger P at several points, as indicated at 28. This may be done with a special tool and is sufficient to hold the split bushing in place because there are no operating strains on it. When the valve is opened, the plunger P is first pulled upwardly and the shoulder 21 strikes the head 22, thereupon lifting the stem S. All that the retainer projections 28 have to do is to hold the split bushing B in position. When the valve closes, the valve plug 24 is struck by the bushing B but the tendency is to drive the bushing into the plunger rather than extract it therefrom. Therefore the split bushing effectively keeps the shank 23 aligned with the center of the plunger P and all operating strains are taken by the integral shoulder 21 and the integral head 22.

Having described a specific embodiment of my present invention as well as the operation thereof, it is to be understood that the form selected has been illustrated merely for the purpose of facilitating disclosure of the invention so that those skilled in the art to which it appertains may make the same. It is to be further understood that various modifications, adaptations and alterations may be applied to the specific form disclosed, to meet the requirements of practice, and mechanical equivalents may be used for certain elements of the invention without in any manner departing from the spirit and scope thereof except as set forth in the appended claims.

I claim as my invention:

1. In a valve structure, a plunger, a one piece stem for said plunger having an integral enlarged head and a shank below said head, said plunger having a slot inwardly from one side thereof of sufficient width to receive said shank, said slot having the bottom thereof enlarged longitudinally of said plunger from the upper end thereof to a point spaced from the lower end thereof, the portion of said plunger below the lower end of said enlarged portion of said slot constituting a shoulder to engage said head and thereby lift said stem when said plunger is moved in one direction, and means to retain said shank with respect to said slot comprising a split bushing surrounding said shank below said shoulder, said plunger having an enlarged bore portion to receive said split bushing, said split bushing being countersunk therein and the material of the lower end of said plunger adjacent the periphery of said split bushing being deformed inwardly over the lower end thereof to retain it in its countersunk position in said bore portion.

2. In a valve structure, a plunger, a one piece stem for said plunger having an integral enlarged head and a shank below said head, said plunger having a slot inwardly from one side thereof of sufficient width to receive said shank, said slot having the bottom thereof enlarged longitudinally of said plunger from the upper end thereof to a point spaced from the lower end thereof, the portion of said plunger below the lower end of said enlarged portion of said slot constituting a shoulder to engage said head and thereby lift said stem when said plunger is moved in one direction, and means to retain said shank with respect to said slot comprising a split bushing surrounding said shank below said shoulder, the material of the lower end of said plunger adjacent the periphery of said split bushing being deformed inwardly over the lower end thereof.

3. A plunger and stem assembly comprising an elongated plunger having a slot inwardly from one side thereof and extending throughout the length of the plunger, the bottom of the upper portion of said slot being enlarged at substantially the axis of said plunger whereby the lower portion of the plunger constitutes a shoulder, said stem comprising a shank of such diameter that it will pass through the slot during assembly, said shank having an integral valve plug at its lower end and an integral head on its upper end, said head being enlarged with respect to said slot whereby to enter the upper end of and slide in the enlarged portion of the slot and engage said shoulder during the upward movement of the plunger, and means spaced wholly below said shoulder to retain said shank in said slot against dislocation therefrom after assembly of said stem relative to said plunger.

4. In a plunger and stem assembly, a plunger having a bore from its top to a point spaced upwardly from the bottom thereof and a reduced bore below said point and terminating in an enlarged bore at its lower end, said stem having a shank and a head integral with each other, said reduced bore being substantially the same size as the diameter of said shank, said plunger having a slot inwardly from one side thereof to receive said shank, said slot being substantially the same width as the diameter of said shank, a split bushing fitted in said enlarged portion of said reduced bore, and means to retain said split bushing therein.

5. In a plunger and stem assembly, a plunger having a bore from its top to a point spaced upwardly from its bottom end and having a reduced bore enlarged at its lower end, said reduced bore and enlarged end thereof extending downwardly from said point to the bottom of said plunger, said stem having a shank and a head integral with each other, said reduced bore being substantially the same size as the diameter of said shank, said plunger having a slot inwardly from one side thereof to receive said shank, said slot being substantially the same width as the diameter of said shank, and a split bushing fitted in said enlarged end of said reduced bore.

BURTON E. SHAW.